United States Patent
McCaleb et al.

[11] Patent Number: 5,504,411
[45] Date of Patent: Apr. 2, 1996

[54] BATTERY CHARGER CONTACT PROTECTION CIRCUIT

[75] Inventors: Frank D. McCaleb, Loxahatchee; Scott Garrett, Boca Raton; Kuruvilla Valakuzhy, Coral Springs, all of Fla.

[73] Assignee: Motorola, Inc., Schaumburg, Ill.

[21] Appl. No.: 205,467

[22] Filed: Mar. 4, 1994

[51] Int. Cl.⁶ ............................................. H02J 7/06
[52] U.S. Cl. .......................... 320/2; 320/51; 320/54
[58] Field of Search ................................. 320/2, 11, 29, 320/30, 35, 36, 47, 51, 54; 323/908

[56] References Cited

U.S. PATENT DOCUMENTS 5,108,847  4/1992  Edwards et al. .................... 320/2 X
5,194,799  3/1993  Tomantschger ...................... 320/2 X
5,200,689  4/1993  Interiano et al. ..................... 320/20

Primary Examiner—Peter S. Wong
Assistant Examiner—Edward Tso
Attorney, Agent, or Firm—Kenneth M. Massaroni

[57] ABSTRACT

A battery charger contact protection circuit (10) including a metal oxide field effect transistor (16) is provided. The battery charger contact protection circuit (10) adds the advantages of reducing heat, reducing cost, and providing flexibility in the charging of various types of battery chemistries. Excess heat is eliminated by reducing the amount of charge dissipated by the contact protection circuit.

22 Claims, 1 Drawing Sheet

BATTERY CHARGER CONTACT PROTECTION CIRCUIT

TECHNICAL FIELD

This invention relates in general to the field of secondary battery charging devices, and more particularly to battery charging contacts.

There has been a great deal of interest in developing better and more efficient methods for storing energy for applications such as radio communication, satellites, portable computers, and electric vehicles to name but a few. Accordingly, there have been recent concerted efforts to develop high energy, cost effective batteries having improved performance characteristics.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e. recharged) many times by the application of an electrical charge thereto. Numerous advanced battery systems have been developed for storing electrical charge. Concurrently, much effort has been dedicated to the development of electrical battery chargers adapted to apply charging currents to these various new battery systems.

As electrochemical cell chemistry became more complex, design and fabrication of complimentary battery chargers likewise did so. As a result, present day, state-of-the-art battery chargers typically have many electronic components, and are software controlled. Further, the initiation, maintenance, and termination of charging currents to the battery system are controlled by complex algorithms embedded in the charger software. Battery cell temperature, temperature changes, battery voltage, changes in voltage, and other parameters are constantly monitored by the battery charger software to optimize the charging process.

One of the problems encountered in rechargeable battery systems is the possibility of external short circuiting of the battery cells through the charging contacts. Traditionally this has been solved by adding a diode to the charging circuit in series with the cell or battery. The diode allows the charger to supply a charging current to the cell or battery while preventing any flow of current in the reverse direction, thus preventing the cells from short circuits through the charger contacts.

Even though the use of a diode in the charging circuit has traditionally provided adequate charge contact protection from external short circuits, it has several drawbacks. Foremost among these problems is heat generated by the diode during the charging process. Heat build-up leads to consumer dissatisfaction resulting from exceedingly warm batteries after the charging process, and also can cause malfunction of the chargers due to faulty cell temperature readings.

Recent attempts have been made to reduce heat generated by diodes disposed in the charging circuit. One example is the use of schotky diodes. A schotky diode, by virtue of its low voltage drop, dissipates much less heat than a conventional diode. Although it generally has generally yielded positive results in the charging scheme, a single schotky diode carrying a 1.5 amp charge current will still dissipate approximately 0.6 watts of unwanted heat. This amount of heat can cause erroneous temperature readings of the cells, leading to improper charging of the battery system. Moreover, schotky diodes are relatively expensive circuit elements, thus increasing the overall cost.

Accordingly, there exists a need to provide battery charging contact short circuit protection, while avoiding unwanted voltage drop, and therefore temperature rise in the battery. It would also be preferable if such a device could be effected without the use of relatively expensive circuit elements.

DETAILED DESCRIPTION OF THE PREFERRED EMBODIMENT

Figure 1:
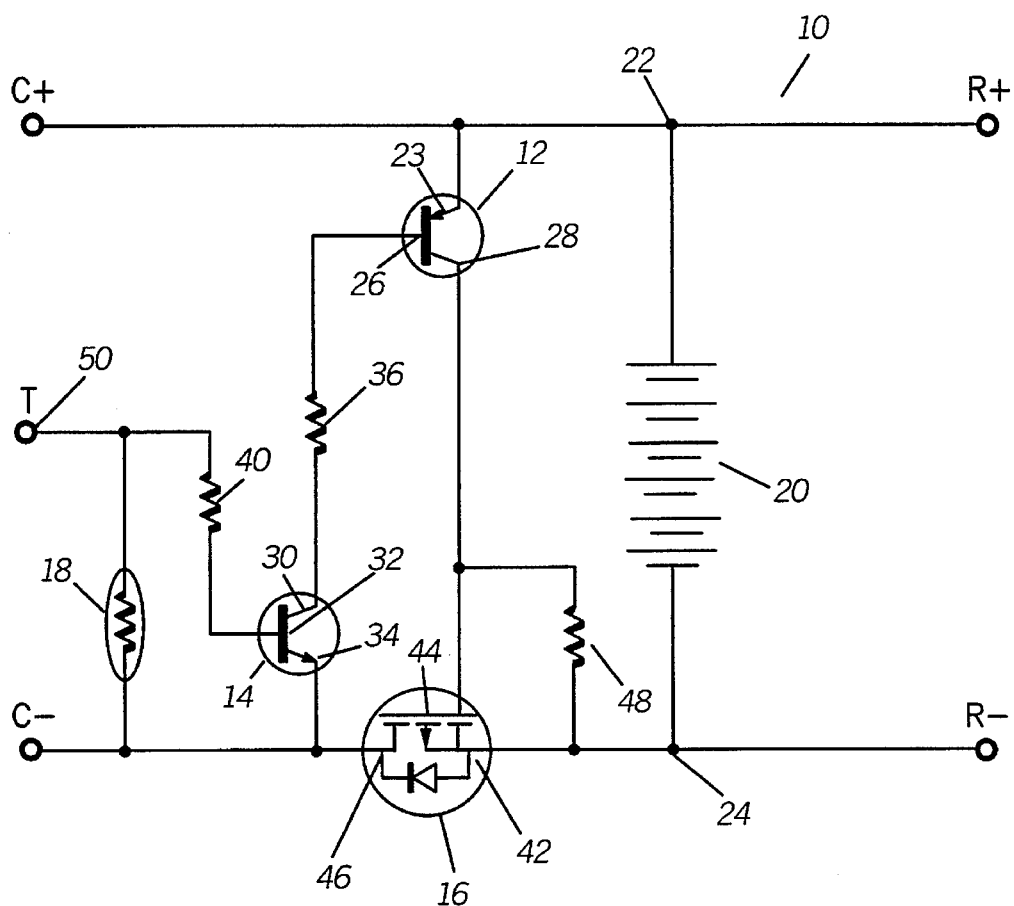
FIG. 1 is a schematic circuit diagram illustrating a battery charger contact protection circuit in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic circuit diagram of a battery charger contact protection circuit in accordance with the instant invention. More particularly, the circuit 10 includes first, second, and third transistors 12, 14, and 16 respectively, and thermistor 18, all electrically coupled between a power source (shown in FIG. 2) and a series of electrochemical cells 20 such as a battery, to be charged by the power source. The battery 20 further is engaged in the circuit by a positive electrical contact 22 and a negative electrical contact 24. The first and second transistors 12 and 14 may be bipolar transistors, each having an emitter, a base, and a collector. For example, bipolar transistor 12 has emitter 24, base 26, and collector 28. Similarly, bipolar transistor 14 has collector 30, base 32, and emitter 34.

As may be appreciated from a perusal of FIG. 1, the first bipolar transistor 12 is electrically coupled between the power source and said second transistor 14 and third transistor 16. More particularly, the emitter of 24 of transistor 12 is electrically coupled between the power source, and the cell 20. The base 26 is electrically coupled to collector 30 of the second transistor 14. The collector 28 of the first transistor 12 is electrically coupled to the third transistor. The base 26 of the first transistor 12 may be electrically coupled to the second transistor via resistor 36.

Figure 2:
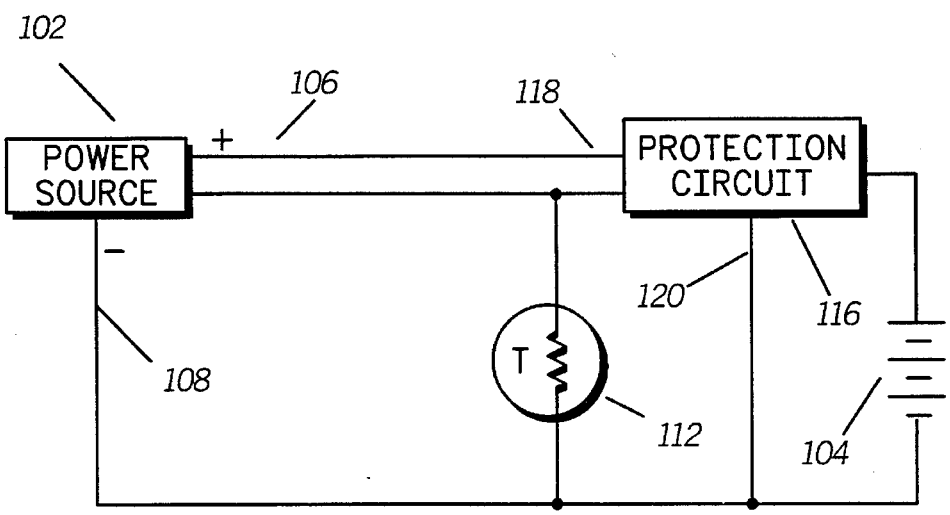
FIG. 2 is a block diagram of a battery charging device, including a battery charger contact protection circuit in accordance with the invention.

The transistor 14 is also electrically coupled to the power source at the emitter 34. Moreover, the base 32 is electrically coupled to thermistor 18 via resistor 40. Thermistor 18 is electrically coupled between the second transistor and the power source, as illustrated in FIG. 2.

The third transistor 16 may be a MOSFET and may include a source region 42, a gate region 44 and a drain region 46. The source 42 is electrically coupled to the negative electrical contact 24 of the circuit, the gate region is electrically coupled to the collector 28 of the first transistor 12, and the drain 46 is electrically coupled to the emitter 34 of the second transistor 14. As may be further contemplated, a third resistor 48 may be electrically coupled between the negative electrical contact 24 and the gate 44.

In operation, thermistor 18 is in contact with contact 50, and is biased with a positive voltage which will effected by thermistor 18 resistance. Specifically, the resistance of thermistor 18 will change with temperature of the system. The charge protection circuit reacts to the aforementioned positive bias for the purpose of determining if the battery is intended to be charged, and close the charge loop accordingly.

In the quiescent state (i.e., in the state in which the battery is not intended to be charged), thermistor 18 is in series with resistor 40 and applies 0 volts to the base of the second transistor 14. Transistor 14 is therefore turned off with no current flow 36 to the bases 26 of transistor 12. This results in this transistor being "turned off." In this state, no current will flow from the collector 28 of the first transistor 12 through resistor 48, leaving the source 42 and gate 44 of the third transistor 16 at the same potential. With the source and gate at the same potential, no current will flow from the battery negative 24, and the charge contacts are protected.

When charging is intended, a battery will be inserted in a charging device incorporating the instant charger protection circuit. Thermistor 18 is positive biased through contact 50. A nominal amount of current is diverted through resistor 40. Routing this circuit through the base/emitter of the second transistor 14 causes transistor 14 to conduct through the collector 28 of the first transistor 12. Through resistor 36, and through the base/emitter of the first transistor 12, thereby causing the first transistor to conduct. When the first transistor is conducting, current flows from the collector 28 through resistor 48 to ground, resulting in a positive voltage at the gate 44 of transistor 16. This positive voltage will exceed the threshold voltage for MOSFET 16, and will cause it to conduct, allowing charging current to flow through transistor 16. Upon recovering positive bias in contact 50, the system will revert to the quiescent state.

Referring to FIG. 2, a block diagram coupling a power source 102 to a battery 104 is shown. The power generated by the power source 102 is coupled to the battery 104 via two power lines 106 and 108. The latter serves as the ground return for all signals communicated between the charger 102 and the battery 104. The battery 104, which includes at least one electrochemical cell having a cell capacity (C), is coupled to the power line 106 via the protection circuit 116, as described above with reference to FIG. 1. The cells 114 may be nickel cadmium, nickel metal-hydride, or any other rechargeable electrochemical cell. Also included is a thermistor 112 which is used to monitor the temperature of the cell 104 during charging. The thermistor 112 communicates the temperature of the cells 114 to the charger 102, upon request. Moreover, the function of the thermistor with respect to the charge protection circuit is described with reference to FIG.1. The protection circuit 116 is electrically coupled between the power lines 106, 108 via contact lines 118, 120.

The charger 102 is a universal charger. Universal chargers are known for their versatility in charging a variety of batteries. In general, a universal charger is intended to charge batteries having similar packaging while using different technologies. These chargers are highly desired, for they limit the number of chargers needed to charge a variety of batteries that may be used by a user. It is the popularity of universal chargers that the protection circuit 116 is necessary in order to prevent damage to the variety of batteries they may potentially charge. The operation of chargers, and in particular universal chargers, is well known in the art. A battery placed in the charger 102 is first evaluated for its internal temperature. If within a predetermined window, the charger proceeds to rapid charge the battery, often using a current source. The temperature level or the rate of increase of the temperature of the battery determines the charge period. The protection circuit 116 assures that current flow between the contacts can take place only when a battery is disposed therein. The protection circuit further accomplishes this end with a minimum of costly circuit components, and without generating unwanted heat in the battery.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A contact protection circuit for use in an electrochemical cell recharging apparatus having a power source, and at least a first and second electrical contact for engaging an electrochemical cell, said contact protection circuit comprising:

a thermistor;

a first transistor electrically coupled between said power source and said first electrical contact;

a second transistor electrically coupled to said first transistor, and said thermistor; and a third transistor electrically coupled to said first and second transistor, and said second electrical contact.

2. A circuit as defined in claim 1, wherein said first transistor is a bipolar transistor having an emitter, a base, and a collector wherein the emitter is electrically coupled between said power source and said first electrical contact, said base is electrically coupled to said second transistor and said collector is electrically coupled to said third transistor.

3. A circuit as defined in claim 1, wherein said second transistor is a bipolar transistor having an emitter, a base, and a collector and wherein the emitter is electrically coupled to said first transistor, said base is electrically coupled to said thermistor, and said collector is electrically coupled to said third transistor.

4. A circuit as defined in claim 1, wherein said third transistor is a MOSFET having a source, a drain, and a gate, and wherein said source is electrically coupled to said second electrical contact, said gate is electrically coupled to said first transistor, and said drain is electrically coupled to said second transistor and said power source.

5. A circuit as defined in claim 4, wherein said MOSFET is in an unbiased condition when an electrochemical cell is not resident in said recharging apparatus.

6. A circuit as defined in claim 1, further including a first resistor operatively disposed between said first and said second transistors.

7. A circuit as defined in claim 1, further including a second resistor operatively disposed between said thermistor and said second transistor.

8. An apparatus for charging a rechargeable electrochemical cell, said apparatus comprising:

a power source for supplying an electrical charge to said rechargeable electrochemical cell, at least first and second electrical contact means adapted to engage said electrochemical cell; and a charge protection circuit having a thermistor, a first transistor electrically coupled between said power source and said first electrical contact means, a second transistor electrically coupled to said first transistor and said thermistor, and a third transistor electrically coupled to said first and second transistor.

9. An apparatus as defined in claim 8, wherein said first transistor is a bipolar transistor having an emitter, a base, and a collector wherein the emitter is electrically coupled between said power source and said first electrical contact means, said base is electrically coupled to said second transistor and said collector is electrically coupled to said third transistor.

10. An apparatus as defined in claim 9, wherein said second transistor is a bipolar transistor having an emitter, a base, and a collector, and wherein the emitter is electrically coupled to said first transistor, said base is electrically coupled to said thermistor, and said collector is electrically coupled to said third transistor.

11. An apparatus as defined in claim 8, wherein said third transistor is a MOSFET having a source, a drain, and a gate, and wherein said source is electrically coupled to said second electrical contact means, said gate is electrically coupled to said first transistor, and said drain is electrically coupled to said second transistor and said power source.

12. An apparatus as defined in claim 11, wherein said MOSFET is in an unbiased condition when an electrochemical cell is not resident in said recharging apparatus.

13. An apparatus as defined in claim 11, wherein said MOSFET is in an unbiased condition when an electrochemical cell is not resident in said recharging apparatus.

14. An apparatus as defined in claim 8, further including a first resistor operatively disposed between said first and said second transistors.

15. An apparatus as defined in claim 8, further including a second resistor operatively disposed between said thermistor and said second transistor.

16. A charge contact protection circuit for use in a battery charging apparatus, said circuit comprising:

a thermistor;

a first bipolar transistor;

a second bipolar transistor, said second bipolar transistor electrically coupled to said first transistor and said thermistor; and a MOSFET electrically coupled to said first and second transistor.

17. A circuit as defined in claim 16, wherein said first transistor is a bipolar transistor having an emitter, a base, and a collector wherein said base is electrically coupled to said second transistor and said collector is electrically coupled to said third transistor.

18. A circuit as defined in claim 16, wherein said second transistor is a bipolar transistor having an emitter, a base, and a collector, and wherein the emitter is electrically coupled to said first transistor, said base is electrically coupled to said thermistor, and said collector is electrically coupled to said third transistor.

19. A circuit as defined in claim 16, wherein said third transistor is a MOSFET having a source, a drain, and a gate, and wherein said gate is electrically coupled to said first transistor, and said drain is electrically coupled to said second transistor.

20. A circuit as defined in claim 19, wherein said MOSFET is in an unbiased condition when an electrochemical cell is not resident in said battery charging apparatus.

21. A circuit as defined in claim 16, further including a first resistor operatively disposed between said first and said second transistors.

22. A circuit as defined in claim 16, further including a second resistor operatively disposed between said thermistor and said second transistor.

\* \* \* \* \*